Figure 1:
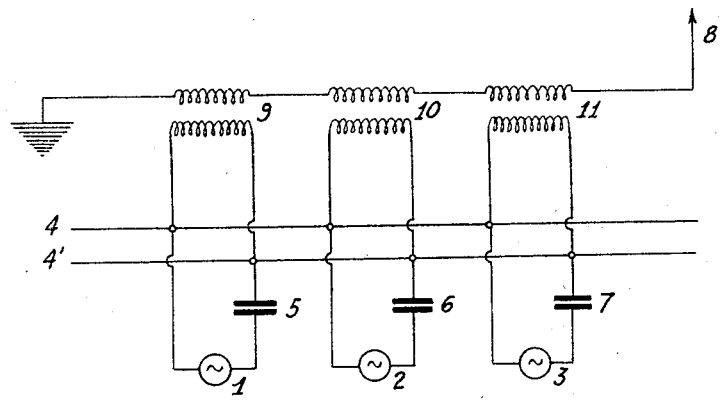

Sept. 8, 1925.

G. BELFILS 1,552,670

RADIO TRANSMITTING SYSTEM

Filed Aug. 29, 1921       2 Sheets-Sheet 1

Inventor
GEORGES BELFILS
By his Attorney

Sept. 8, 1925.

G. BELFILS 1,552,670

RADIO TRANSMITTING SYSTEM

Filed Aug. 29, 1921   2 Sheets-Sheet 2

Inventor
GEORGES BELFILS
By his Attorney Ira J Adams

Patented Sept. 8, 1925.

1,552,670

UNITED STATES PATENT OFFICE.

GEORGES BELFILS, OF BELFORT, FRANCE.

RADIO TRANSMITTING SYSTEM.

Application filed August 29, 1921. Serial No. 496,542.

(GRANTED UNDER THE PROVISIONS OF THE ACT OF MARCH 3, 1921, 41 STAT. L., 1313.)

*To all whom it may concern:*

Be it known that I, GEORGES BELFILS, a citizen of France, and resident of Belfort, France, have invented certain new and useful Improvements in Radio Transmitting Systems (for which I have filed applications in France, filed July 9, 1919, granted August 31, 1920, No. 510,177; France, filed Oct. 16, 1919, granted Feb. 8, 1921, No. 22,615; United Kingdom, filed July 7, 1920, granted Oct. 7, 1921, No. 147,465; United Kingdom, filed June 16, 1921, granted Sept. 22, 1921, No. 165,037; Germany, filed June 22, 1920, granted April 13, 1921, No. 337,849; Argentine Republic, filed January 18, 1921, granted March 6, 1923, No. 19,166; Argentine Republic, filed Jan. 18, 1921, granted March 6, 1923, No. 19,167; Australia, filed Sept. 1, 1920, granted Jan. 31, 1923, No. 17,551; Belgium, filed July 7, 1920, granted Aug. 14, 1920, No. 289,776; India, filed July 23, 1920, granted Oct. 24, 1921, No. 6,012; Brazil, filed July 10, 1920, granted Feb. 2, 1923, No. 13,543; Canada, filed March 22, 1921, granted Oct. 20, 1923, Ser. No. 252,551; China, registered Aug. 16, 1920, registration No. 21,039; Belgian Congo, filed July 29, 1920, granted July 29, 1920, No. 628; Denmark, filed June 19, 1920, granted Oct. 26, 1923, No. 32,465; Egypt, registered July 15, 1920, registration No. 153/45; Spain, filed June 30, 1920, granted Oct. 16, 1920, No. 74,280 bis; Holland, filed July 9, 1920, granted March 23, 1923, No. 8,396; Italy, filed July 8, 1920, granted March 17, 1923, No. 27/554; Morocco, filed July 10, 1920, granted Dec. 20, 1920, No. 199; Norway, filed June 24, 1920, granted Nov. 5, 1923, No. 38,216; Poland, filed July 7, 1920, not yet granted; Portugal, filed July 7, 1920, granted April 28, 1921, No. 11,623; Rumania, filed June 17, 1920, granted Oct. 11, 1922, No. 6,492; British South Africa, filed Dec. 24, 1920, granted Sept. 26, 1921, No. 1,415; Sweden, filed June 26, 1920, granted Jan. 24, 1924, No. 56,345; Switzerland, filed June 26, 1920, granted Aug. 16, 1922, No. 95,771; Czechoslovakia, filed July 10, 1920, granted Nov. 29, 1921, No. 8,211; Tunisian Protectorate, filed July 7, 1920, granted Sept. 21, 1921, No. 1,747), of which the following is a specification accompanied by drawings.

There are many inconveniences encountered in the use of the unitary high powered machines that are used in the powerful stations necessitated by intercontinental radiotelegraphic communicating systems. Concerning the replacement in case of damage, the use of a large unitary structure for the feeding of a station, results in a utilization coefficient of low value with respect to the total power installed. On the other hand, the operation of the stations transmitting to shorter distances than above mentioned is effected by a rather uneconomical output.

The object of the present invention is to remedy these defects by distributing the load among a plurality of machines connected in parallel to the antenna.

As well known, such operation is impossible unless the alternators are maintained in phase, and this may be accomplished by means of a mechanical connection between the rotating parts.

This solution, which has been already effected, has particularly in the case of high frequency alternators many drawbacks: precise mounting, rigid connecting link, difficult couplings and uncouplings.

The following arrangement furnishes a good solution of the problem involved in coupling the alternators of a radiotelegraphic station. Independently of any mechanical connection, the parallel functioning parts of the alternators are joined as much as possible by increasing to the maximum the synchronizing force of each machine due to the establishment of a condition in which the output circuit comprising one of the alternators in question has a reactance equal to the resistance. In accordance with the present invention, the adjusting of this reactance to the above mentioned value is preferably accomplished by inserting a condenser of suitable capacity in the shunt circuit of each alternator. In the case of high frequency alternators, the value of the synchronizing force may be made equal to several times the value of the normal element.

Figure 2:
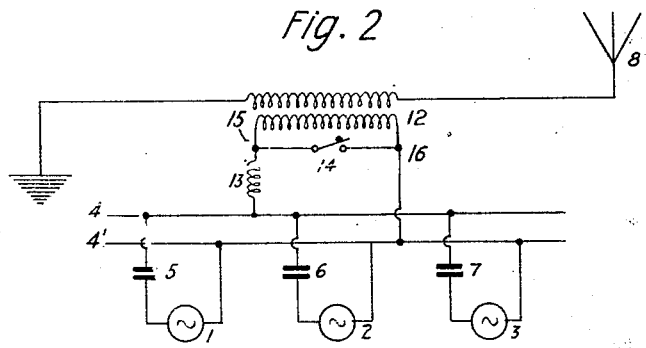
Figure 3:
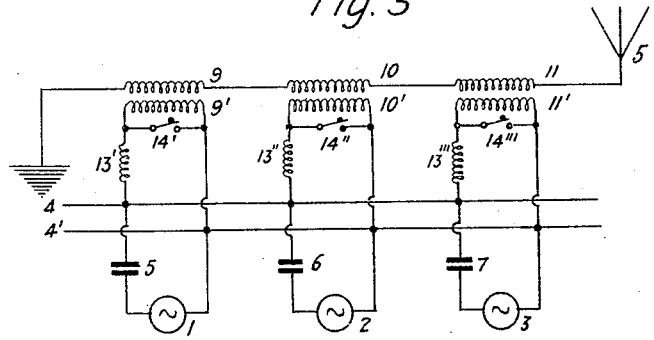
Figure 4:
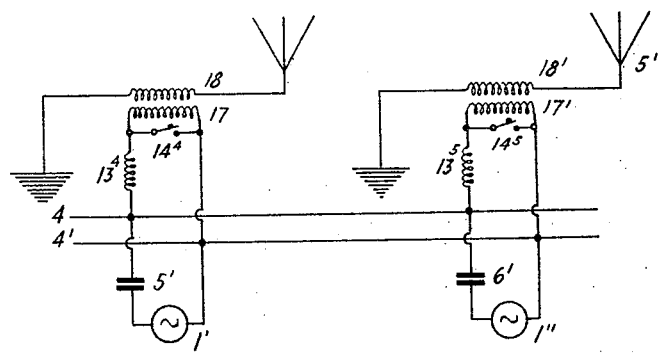

In the accompanying drawings which represent, by way of example, several modifications of the invention, Fig. 1 shows a simple diagrammatic arrangement of a plurality of alternators in parallel, feeding a single transmitting circuit, Figs. 2 and 3 show two different modifications of a plurality of alternators in parallel, arranged to transmit telegraphic signals from a single antenna and, Fig. 4 shows a modification showing a plurality of alternators in parallel arranged to transmit telegraphic signals from a plurality of antennæ.

1, 2 and 3 are three alternators connected in parallel to the bus bars 4 and 4'. The circuit connecting each alternator to the bus bars comprises in series the condensers 5, 6 and 7, respectively. The antenna 8 is indirectly energized, e. g. through the agency of the transformers 9, 10 and 11 fed from the bus bars.

Obviously, this arrangement may be applied to any number of alternators connected in parallel and to any system for feeding the antenna from the bus bars, direct or indirect feeding, through one or a plurality of devices.

In accordance with the modifications shown in Figs. 2, 3 and 4, I provide means permitting the use of such group of alternators for the sending of radiotelegraphic signals and more particularly to electrical circuit arrangements comprising the sending key and interconnecting the group of machines and the antenna.

In the case of a radiotelegraphic station equipped with a plurality of alternators operating in parallel, the sending operation can no more be effected by shortcircuiting the feeding source of the antenna, because the synchronizing force of each machine would be almost entirely destroyed. By means of the following arrangements this is avoided.

In accordance with this improvement, a self inductance of a predetermined value is inserted in series in the charging circuit through which the free energy between the bus bars of the installation is transmitted to the antenna. This inductance balances the effect of the coupling capacities described. The sending key is shunted around the terminals of the charging circuit whereby the operation of the key will cause the short-circuiting of the charging circuit. Due to this arrangement, the operation of the key will not destroy the synchronizing force because when the charging circuit is short-circuited the self inductance constitutes an inductive charge corresponding to a very large reactance as compared to the reactance composed of the circuits of the interconnected alternators.

Tests made with such arrangements show that the synchronizing force remains the same, the alternators being maintained empty or charged under the control of the key.

Figs. 2, 3 and 4 show applications of the invention to certain particular cases and are given to illustrate and not to limit the scope of the invention.

In Fig. 2, three alternators are used and are schematically illustrated at 1, 2 and 3. The alternators are connected in parallel with the bus bars 4 and 4' through condensers of suitable capacity, in accordance with the previous disclosure. These condensers are illustrated at 5, 6 and 7. The antenna 8 is fed from the bus bars through, for example, an inductive coupling (Tesla transformer) illustrated at 12. The charging circuit comprises the primary winding of this radio-transformer. In accordance with the present invention, the charging circuit is connected to the bus bars through an inductance 13 (the value of which may be determined in the manner to be hereinafter set forth) and the key 14 is shunted around the terminals 15 and 16 of the charging circuit.

Obviously, the principle of feeding the charging circuit through an inductance 13 and of short-circuiting it by the key 14 may be applied also in the case (not shown) when the antenna is energized by shunt connection instead of being energized by induction.

Furthermore, in case high power is used, it may be advisable to feed the antenna by means of a plurality of charging circuits connected in shunt to the bus bars as in Fig. 1. Under these conditions the antenna will be supplied with current by means of three charging circuits, as shown in Fig. 3. In this figure 9, 10 and 11 are radiotransformers feeding the antenna; 9', 10' and 11' are the primaries of these transformers; 13', 13" and 13''' are the inductances through which the charging circuits are respectively fed; 14', 14" and 14''' are the respective keys of the three charging circuits, any well known means being provided for simultaneously operating these keys.

Obviously, any number of charging circuits may be used and the secondaries of the radiotransformers may be provided in series, in parallel or in series-parallel circuits.

In order to prevent the actuation of a single antenna at too high a power, a plurality of independent antennæ may be fed simultaneously from the bus bars. Fig. 4 illustrates an arrangement in which two antennæ 5', 5" are used, and in which 1' and 1" represent the feeding alternators connected in parallel with the bus bars 4 and 4' through the coupling condensers 5' and 6'. The two antennæ may be excited by means of radiotransformers 18 and 18', the primaries 17 and 17' of which are fed from the bus bars through the self inductances $13^4$ and $13^5$ and may be short circuited upon the simultaneous actuation of the keys $14^4$ and $14^5$, Preferably, the inductances should be so selected that they possess such a self induction coefficient that the value of the current issuing from each alternator when the key is actuated is equal to the value of the short circuit current of the machine.

Experience shows that by applying the above specified arrangements, the value of the synchronizing force of the parallel alternators may be preserved at the same value irrespective of the position of the key.

Having described my invention, what I claim is:

1. In a radio transmitting station, the combination of radiating means, a plurality of parallel high frequency alternators for feeding said radiating means and an additional impedance connected in each parallel branch, said additional impedance being of such value as to bring the total impedance of the parallel branch and the resistance thereof substantially to equality.

2. In a radio transmitting station the combination of radiating means, a plurality of high frequency alternators connected in parallel for feeding said radiating means and a condenser in series with each generator.

3. In a radio transmitting station, the combination of radiating means, a charging circuit comprising a plurality of high frequency alternators connected in parallel for feeding said radiating means, a condenser in series with each alternator and an inductance in the charging circuit.

4. In a radio transmitting station, the combination of radiating means, a charging circuit comprising a plurality of high frequency alternators connected in parallel for feeding said radiating means, a condenser in series with each alternator and an inductance in the charging circuit and means for shortcircuiting the charging circuit, said means being connected to include the alternators and inductance.

GEORGES BELFILS.